June 11, 1940.                M. CONANT                2,204,010
                    ELECTRIC CURRENT RECTIFIER
                       Filed Aug. 1, 1938

INVENTOR.
Margaret Conant
BY
Hoving Hamilton
ATTORNEYS

Patented June 11, 1940

2,204,010

UNITED STATES PATENT OFFICE 2,204,010

ELECTRIC CURRENT RECTIFIER

Margaret Conant, Kansas City, Kans.

Application August 1, 1938, Serial No. 222,423

2 Claims. (Cl. 175—366)

This invention relates to electrical current rectifiers of the nature wherein is employed a plurality of units each of which has an oxide coating on one side thereof so as to permit the flow of electric current in one direction and preclude the passage thereof in the opposite direction.

One of the important aims of this invention is to provide a method of producing oxide coated units for electrical current rectifiers, the steps of which consist in removing the oxide coating from the edges of the units so as to overcome inverse leakage in the rectifier and thereby render the same more efficient for use with direct current measuring instruments and with other apparatus requiring the employment of rectifiers offering no resistance in a forward direction and an infinite resistance in the inverse direction.

A further object of the present invention is the provision of the step in the method of making oxide coated units for electrical current rectifiers which consists in applying carbon to the coated face of the unit as the latter is revolved about its axis at a high rate of speed to the end that the application of a uniform coating of carbon is formed.

It is well-known in this art that rectifiers wherein are employed a number of superimposed units or plates are desirable only when the inverse leakage is as low as possible, and preferably where such leakage is entirely absent. Experience has taught that most of the inverse leakage of rectifiers, of the aforementioned character, is due to fractures that are present in the oxide coating on the units around the edges thereof. In the disc shaped unit commonly employed, the aperture therethrough presents an inner annular edge and this edge is partially coated during the heat treatment to which the unit is subjected. The outer annular edge of the unit always receives a cuprous oxide coating and a cupric oxide coating which is of a thickness equal to the useful coating which is created on the face of the unit.

Heretofore, the oxide coatings on the edges of the units have been left intact, but this invention contemplates the complete removal of the coatings and the cleansing of the metal on these edges. Rectifiers embodying units, treated in accordance with this method should be approximately ½ inch in diameter and the central aperture should have a diameter of .165 inch. When the coating is removed from the edges of such units, a leakage of less than $\frac{1}{10}$ milliampere at a potential of 5 volts and a temperature of 35° C. is all that is exhibited.

When testing the units made in accordance with this invention, the said leakage is approximately that above mentioned or lower, and when such is not the case, examination has invariably disclosed that some of the oxide coating still remains on the edges of the unit.

The steps in the method of creating rectifier units must be carefully performed for certain ways of handling the units must be followed in order to accomplish the desired end.

One illustrated embodiment of a rectifier unit, the manner of grinding the oxide coating from the edges of the units, and the preferred way of applying carbon to one face of one of the units, is shown in the accompanying drawing wherein.

Rectifiers of the character wherein the units illustrated are used, are well-known in the art and thoroughly understood by those skilled in their production. In this specification therefore, the unit per se will be referred to, and the method of producing that unit in accordance with this invention will be made clear.

In the first instance, the selection of satisfactory material is important, for the copper which is to be processed should be pure and substantially uniform in thickness. Commercial copper in sheet form is not satisfactory for the thickness thereof is not uniform and rolling of the stock must be performed in order to produce small sheets of .0035 inch in thickness. In practice, it has been found desirable to clean one side of the copper after it has been cut into strips substantially 1 inch in width. Steel wool may be employed for cleaning the face of the strips while the backs thereof need not be treated. As a matter of fact, the cleaned face of the material is left free of designating marks while the backs of the strips are suitably etched or embossed so as to distinguish the face from the back during the subsequent steps in the manufacture of the unit.

Figure 1:
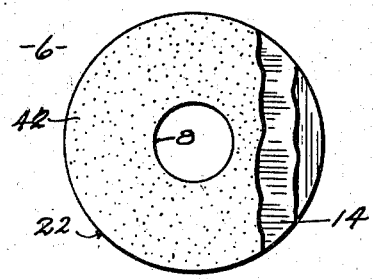
Figure 1 is a face view of a unit for electrical current rectifiers.
Figure 2:
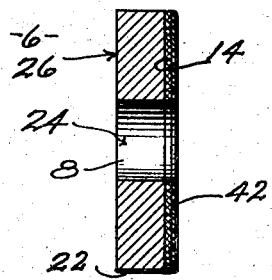
Fig. 2 is a vertical, central section through the same.

When the 1 inch strips are passed through the rolls which produce markings on the backs thereof, a wavy appearance is present and the strip is leveled by passing the same through flattening dies in a punch press. The electrode blanks or units 6, such as shown in Figs. 1 and 2 of the drawing, are then cut from these said strips of copper. The diameter of the disc shaped unit is substantially ½ inch and the aperture 8 that is pressed through the center on the axis thereof, should be approximately 5/32 inch.

The blanks are next tumbled in saw-dust to remove the burs and they again are flattened by being passed through suitable dies in a punch press. The blanks should be thoroughly cleaned in diluted nitric acid prior to the threading for heat treatment. Handling of the blanks or units after acid cleansing should be avoided so that the hereinafter described oxide coating that is created might be as uniform in thickness as possible.

The manner of suspending the blanks 6 in the furnace is important, for if the blanks are too close together, the oxide coating formed thereon is uneven and a warping occurs which renders the units useless.

Rods of heat resisting metal are employed to support units 6. These rods are but a few thousandths smaller in diameter than the diameter of perforation 8 and when the blanks 6 are threaded thereon a space is left between the blanks which permits even oxidation. Care should be taken to preclude touching of the adjoining blanks when on the rod for the distance between the blanks should be at least as great as the thickness thereof.

An electric furnace having a current of air passing therethrough should be preheated to a temperature of 1060° C. before the threaded discs or units 6 are introduced. The blanks should be placed within the furnace so as to receive uniform blasts of air. Upon introduction of a charge of blanks, the furnace temperature will drop to substantially 1000° C. and it will take from 7 to 10 minutes for the starting temperature to again be reached. When this said period of time has expired, the blanks are removed and allowed to air cool until they have been reduced to a temperature of substantially 600° C. Further cooling is accomplished by quenching in a hot oil bath after which the blanks are cleaned in gasoline and are ready for the edging process. The units 6 at this point have a coating of cuprous oxide which is overlaid with a coating of cupric oxide and both of these coatings are involved when the method of treatment contemplated by this invention is followed.

Figure 3:
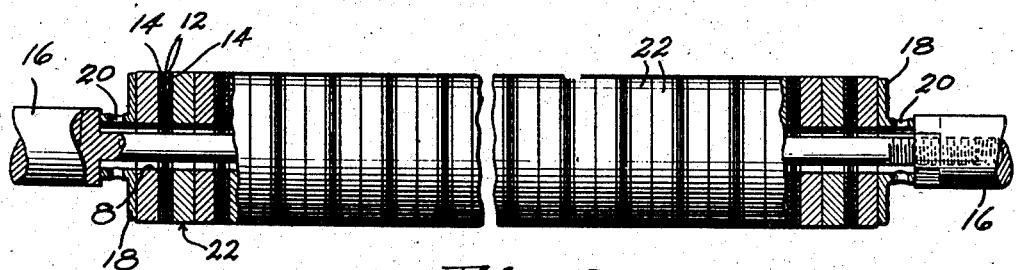
Fig. 3 is a side elevation of a number of rectifier units positioned upon a mandrel for grinding; and, Fig. 4 is an illustrated embodiment of means for spinning one of the rectifier units while the carbon is being applied thereto.

While the outer coating or cupric oxide layer still remains on the units 6, they are threaded upon a mandrel 10 which has a diameter substantially smaller than the diameter of apertures 8 in the manner illustrated in Fig. 3. The aforesaid faces of the units upon which will remain the effective layer of cuprous oxide when the unit is complete, are placed together so that the outer layers or coatings 12 of cupric oxide are together.

The coating of cuprous oxide is designated by the numeral 14 and reference to Fig. 3 will indicate that it overlies coating 12.

Mandrel 10 may be carried by shafts 16 between the ends of which and the ends of the group of units 6, are disposed specially formed heads 18 through which is provided openings 20 for the passage of powdered abrasive. When the group of units 6 is rotated in powdered abrasive not only will the oxide coating on the outer annular face 22 thereof be removed, but the oxide coating that has previously been formed on the inner annular face 24 will be eliminated.

The material from which mandrel 10, shafts 16 and heads 20 are made should be acid resisting, for it is sometimes desirable at this point to complete the cleansing of the outer and inner edges 22 and 24 by bathing these edges in an acid to etch the same a desired amount.

The next step in the production of the unit 6 is to grind the oxide coating from the back surface 26 of each unit 6 so that no coating remains thereon and so that a perfectly smooth and even copper face is presented. This said coating of cuprous oxide and cupric oxide is not shown to be present on unit 6, illustrated in Fig. 3, and it is contemplated that the said oxide coating might be removed by grinding on a carborundum stone prior to the removal of the oxide coating from the inner and outer annular faces of unit 6.

The cupric oxide which overlies the coating of cuprous oxide on the face of unit 6 tends to protect the cuprous oxide during the removal of the oxide coating from the back and edges of the unit 6, but after the coating has been taken from the back and edges, this layer of cupric oxide 14 is ground from the face of the disc so that said face has thereon only a smooth, hard, crystal-like surface of cuprous oxide entirely free from checks and cracks.

Figure 4:
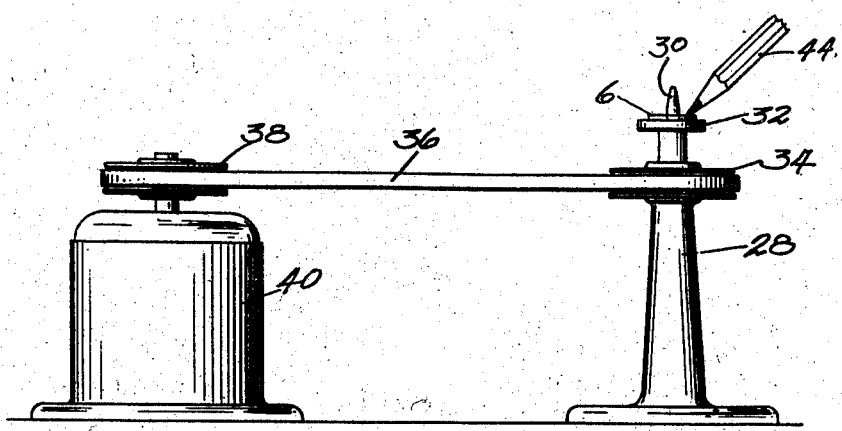

The carbonizing step is important for the carbon must be evenly applied over the outer face of the cuprous oxide coating 14. It has been found that rotating the unit 6 about its axis and applying the carbon through the use of a medium hard, ordinary pencil 44 is highly satisfactory. This coating of carbon 42 is applied merely to secure a perfect electrical contact between the faces of the assembled units 6 when the rectifier is produced, and if the carbon coating is uneven, the efficiency of the rectifier is lowered. Disc 6 may be rotated about its axis by apparatus such as illustrated in Fig. 4 which comprises a stand 28 having a pintle 30 extending above table 32 thereof. A pulley wheel 34 is driven by belt 36 which passes over motor pulley 38 of motor 40. Not only does the carbonizing of disc 6 in this manner furnish a desirably smooth carbon layer, but provides means for quickly accomplishing the step of carbonizing. Obviously, unit 6 may be washed and dried immediately prior to the carbonizing step so that the cuprous oxide face is in good condition to receive the carbon.

At this juncture, the acid etching, set down above, may again be employed after which the units should be thoroughly cleansed in clear water and allowed to dry before testing. This etching when performed after the carbon has been applied or as and at the time set down above, is effective in reducing the inverse leakage to a minimum.

Those skilled in the art are familiar with the manner of testing units 6 prior to their introduction into a complete electrical current rectifier. The conventional testing anvil is employed and the point of perfection, which is no resistance in the forward direction (from copper to coating) and a perfect resistance in the inverse direction, is always the standard.

Having thus described the invention, what is claimed as new and desired to be secured by Letters Patent is:

1. In the making of oxide coated units for electric current rectifiers, the step which consists in applying carbon to a face of the unit as the same is revolved about its axis at a high rate of speed.

2. In the making of oxide coated units for electric current rectifiers, the steps which consist in subjecting the unit blank to heat in the presence of oxygen to create the oxide coating thereon; grinding the oxide coating from one side of the unit; arranging several units having the oxide coating on one face of each, in face to face relation to protect the oxide coating on said faces; subjecting the several units to the action of an abrasive to remove the oxide coating on the edges of the units; and submerging the several units in acid to etch the exposed edges of the units.

MARGARET CONANT.